(12) United States Patent
Fleizach

(10) Patent No.: US 8,601,603 B1
(45) Date of Patent: Dec. 3, 2013

(54) SECURE INFORMATION TRANSMISSION OVER A NETWORK

(75) Inventor: Gregory K. Fleizach, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 237 days.

(21) Appl. No.: 12/957,505

(22) Filed: Dec. 1, 2010

(51) Int. Cl.
*H04K 1/00* (2006.01)
*H04L 29/06* (2006.01)
*G06F 15/16* (2006.01)

(52) U.S. Cl.
USPC ............... 726/29; 726/14; 726/21; 713/150; 380/250; 709/219

(58) Field of Classification Search
USPC ....... 713/150; 380/250; 709/219; 726/14, 21, 726/29
See application file for complete search history.

(56) References Cited

U.S. PATENT DOCUMENTS

| | | | |
|---|---|---|---|
| 4,881,263 A | 11/1989 | Herbison et al. | |
| 4,888,800 A | 12/1989 | Marshall et al. | |
| 5,297,208 A | 3/1994 | Schlafly et al. | |
| 5,909,491 A | 6/1999 | Luo | |
| 6,002,769 A | 12/1999 | McGough | |
| 6,400,823 B1 * | 6/2002 | Angelo | 380/255 |
| 6,665,709 B1 | 12/2003 | Barron | |
| 6,760,751 B1 | 7/2004 | Hachiya et al. | |
| 7,325,052 B1 * | 1/2008 | Motoyama | 709/223 |
| 2007/0198823 A1 * | 8/2007 | Blew et al. | 713/150 |
| 2007/0263868 A1 * | 11/2007 | Youn et al. | 380/255 |
| 2008/0181414 A1 * | 7/2008 | Deaver et al. | 380/279 |
| 2009/0259838 A1 * | 10/2009 | Lin | 713/150 |
| 2010/0217984 A1 * | 8/2010 | Hill | 713/168 |

* cited by examiner

*Primary Examiner* — Beemnet Dada
*Assistant Examiner* — Kalish Bell
(74) *Attorney, Agent, or Firm* — Arthur K. Samora; Kyle Eppele

(57) ABSTRACT

Architecture for secure transmission of data from a sender to a receiver can include multiple network server nodes and a processor that contains computer instructions stored therein for causing the processor to accomplish the methods for secure transmission. The methods can include the initial step of generating a nonce at a server node. A copy of the nonce can be securely transmitted to the intended recipient of the information. The nonce can then be encrypted at the server node using an encryption means that is remotely located from the server node. The actual information is then transmitted from the sender to the server node. The server node decrypts the nonce at the server node using the encryption means, and encodes the information using the decrypted nonce, which is then deleted. The receiver then accesses the server node and decodes the information using its last remaining copy of the nonce.

2 Claims, 3 Drawing Sheets

SECURE INFORMATION TRANSMISSION OVER A NETWORK

FEDERALLY-SPONSORED RESEARCH AND DEVELOPMENT

This invention (Navy Case No. 100481) is assigned to the United States Government and is available for licensing for commercial purposes. Licensing and technical inquires may be directed to the Office of Research and Technical Applications, Space and Naval Warfare Systems Center, San Diego, Code 72120, San Diego, Calif. 92152; voice (619) 553-2778; e-mail T2@spawar.navy.mil.

FIELD OF THE INVENTION

The present invention applies generally to the transmission of information over a network. More specifically, some embodiments of the invention pertain to architecture and methods for secure transmission of data over a network without requiring that both the sender and the receiver of the data have common encryption hardware or software, and without the prior exchange of a password.

BACKGROUND OF THE INVENTION

Modern networks are often used for the transfer of data and information between parties. In many instances, it is desirable for the data to be securely transmitted, for any one of a number of reasons. The data may be personally sensitive to either the sender or the receiver. The information may contain business sensitive data, and valuable trade secrets. Or, in the case of Governments, it may be necessary to transfer data and information securely for operational security reasons.

In the case where the information consists of e-mails, there are many ways to send encrypted e-mails, but they all have certain drawbacks. One way is via an e-mail client such as Outlook using asymmetrical keys (i.e., each party has a public key and a private key). This approach requires special software, and each party must have a public and private key generated in advance. Another possible way to securely send and receive e-mails is to incorporate special hardware devices, which could be incorporated into the network computers and could be used to encrypt and transmit information. But when hardware devices are used for encryption, both parties must have the hardware device, which could become costly and complicated.

One way to send semi-secure information via a web browser could be for the sender to encrypt the information with a password created by the sender. The sender could store the information on a web server, somehow transmit the password to the receiver to decrypt the information, and then the receiver can retrieve and decrypt the information on the web server. Examples of websites that offer this service are Lockbin.com and LuxSci.com. The problem with this approach is that if e-mail or phone is deemed too insecure to transmit the information in the first place, then transmitting the password via the same means cannot be said to be any more secure.

Another possible implementation for secure data exchange is for two people to use a password for a long period of time; the password could be exchanged before the two parties become remote to one another. The problem with this approach is that using the same password for a long time gives a hacker a long time to attempt to guess the password. Yet another simple approach is to encrypt information with a key that is permanently stored on a server. This can become an issue, because if that one encryption key is ever compromised, all of the data stored on the server that was encrypted by that key also becomes compromised.

In view of the above, one object of the present invention is to provide architecture and methods for secure data transfer over a network that do not require any additional hardware other than what is already in place. Another object of the present invention is to provide architecture and methods for secure data transfer over a network that do not require exchange of passwords or pre-arranged encryption keys prior to transmitting the data or information. Another object of the present invention is to provide architecture and methods for secure data transfer that avoids using a single encryption key that could be used to decrypt all encrypted information stored on the server. Still another object of the present invention is to provide architecture and methods for secure data transfer over a network with the generation of encryption keys on a per transaction basis, so that if a hacker was able to compromise an encryption key, the hacker would only decrypt a single information exchange event. Still another object of the present invention is to provide architecture and methods for secure data transfer over a network wherein the encryption key (nonce) and encrypted information are both stored on the same server network only for as long as it takes the server to delete the encryption key (perhaps milliseconds or less). These and other advantages of the invention, as well as additional inventive features, will be apparent from the description of the invention provided herein.

SUMMARY OF THE INVENTION

Server architecture for secure transmission of data from a sender to a receiver according to several embodiments can include at least one nonce server, and can further include at least one computer processor that has non-transitory computer readable medium containing computer instructions stored therein for causing the processor to accomplish methods for secure transmission. The methods according to several embodiments can include the initial step of generating a nonce, or a number used once. The nonce can be generated by the nonce server and then transmitted securely to the intended recipient of the secure information.

The architecture methods can further include the step of encrypting the nonce at the nonce server. To do this, an encryption means can be retrieved from a key server in the network that is remote from the nonce server where the nonce was generated. With this configuration, the nonce and the encryption key for the nonce can be kept in physically separate locations, which can minimize hacking of the nonce by unauthorized personnel.

Once the nonce is encrypted, the architecture and methods of use therefor can further include the step of receiving the information to be transmitted from the sender at the nonce server where the encrypted nonce is located. The nonce server can then retrieve the nonce encryption means from the remote key server where it is located and decrypt the nonce using the encryption means. After decryption of the nonce, the encryption means can be returned to the remote key server. The nonce can then be used to encode the information from the sender using the decrypted nonce. After encoding of the information, the unencrypted nonce is immediately deleted to minimize the time that the nonce and its encoded information are physically located at the same nonce server. The encoded information can then be accessed by the intended receiver at the nonce server, and the receiver can decode the information using the receiver's copy of the nonce, which at this point can be the only remaining copy of the nonce in existence.

In some embodiments, the nonce can be deleted from the server if the sender has not transmitted the information to be encoded by the nonce within a predetermined amount of time after encryption of the nonce by the key. In other embodiments, the encoded information can be deleted at the nonce server if the information has not been accessed by the intended receiver within a predetermined amount of time after encoding of the information by the nonce has occurred.

BRIEF DESCRIPTION OF THE DRAWINGS

The novel features of the present invention will be best understood from the accompanying drawings, taken in conjunction with the accompanying description, in which similarly-referenced characters refer to similarly referenced parts, and in which.

DETAILED DESCRIPTION OF THE EMBODIMENTS

Figure 1:
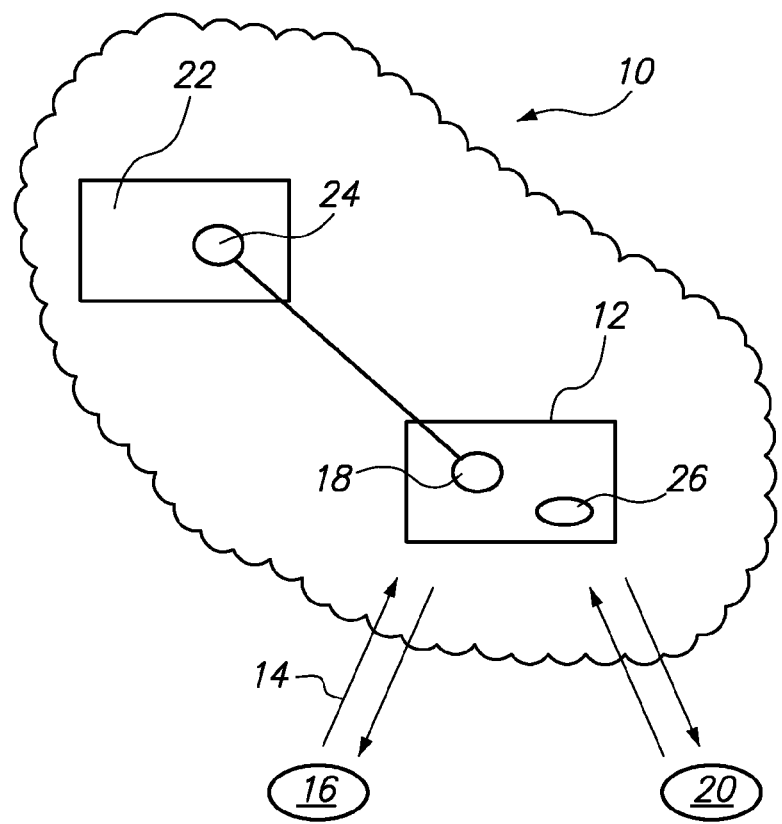
FIG. 1 is a general diagram of server architecture for the secure transmission of information from a sender to a receiver over a network in accordance with several embodiments of the invention.

Referring initially to FIG. 1, architecture for secure transmission of information in accordance with several embodiments can be shown and can be designated by reference character 10. As shown, architecture 10 can include at least one server node, or nonce server 12, for receipt and transmission of information (shown by arrow 14) by sender 16. Nonce server 12 can also generate a number used once, or nonce; the nonce is indicated by reference character 18 in FIG. 1. Nonce 18 can be further transmitted to receiver 20, to practice the encryption methods according to several embodiments. Architecture 10 can further include a second server node, key server 22. A key 24 or similar type of encryption means can be stored at key server 22 and retrieved by nonce server 12 to practice the methods according to several embodiments.

Nonce server 12 can include a processor 26. Processor 26 can be, or can include non-transitory computer readable medium. The computer readable medium can contains computer instructions for accomplishing the methods according to several embodiments of the present invention. The manner in which nonce server 12, key server 22, nonce 18 and key 24 interact to accomplish the secure transmission of data and the methods therefor (the terms "data" and "information" can be used interchangeably in this specification) are described more fully below.

Figure 2:
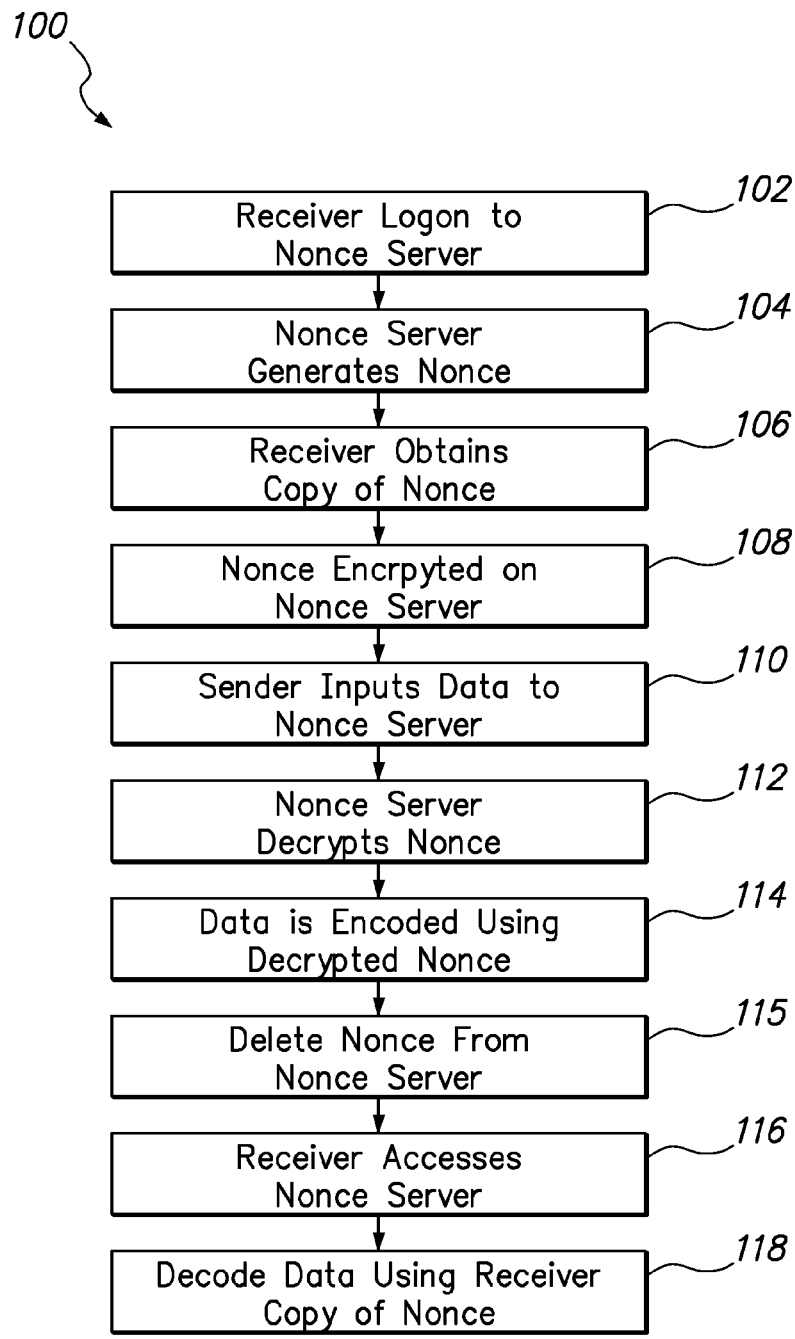
FIG. 2 is a block diagram of an algorithmic sequence of steps that can be taken by a processor that is included in the architecture of FIG. 1, the processor using a non-transitory computer readable medium containing computer instructions stored therein for accomplishing the methods according to several embodiments; and, FIG. 3 is a block diagram, which shows the encryption sub-steps of the encryption step of the methods of several embodiments of FIG. 2 in greater detail.

Referring now to FIG. 2, a block diagram that illustrates methods of the present invention according to several embodiments can be shown and can be designated by reference character 100. As shown, method 100 can include the initial step 102 of the data receiver 20 logging onto nonce server 12. This step can be accomplished using SSL encryption via a website with their username and password. Secure Socket Layer (SSL) is the encryption technology behind the Hypertext Transfer Protocol Secure (HTTPS) protocol that is used every day and that is compatible with any modern web browser. It should be appreciated, however, that other encryption technologies could be used to accomplish this step. Once the receiver 20 has logged on to nonce server 12, the receiver can notify nonce server 12 that the receiver 20 is ready to receive secure information/data from sender 16.

As indicated by block 104 in FIG. 2, the nonce server can generate a number used once (nonce) to serve as the encoding key for yet-to-be-generated information from sender 16. Each nonce is only used once for a corresponding information exchange transaction. The nonce server can send a copy of nonce 18 to receiver 20. Receiver 20 can manually copy, securely download, or copy and paste this nonce and retain the nonce at the receiver's location for future use in decoding the sender's encoded data. After the receipt of nonce 18, receiver 20 logs off and disconnects from nonce server 12. The nonce is itself encrypted for temporary storage on the nonce server, as indicated by steps 108 in FIG. 2.

Figure 3:
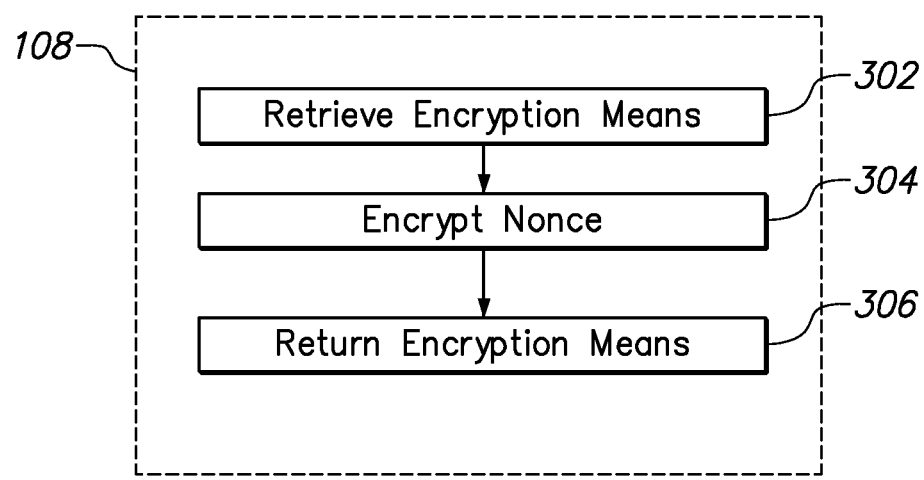

Referring briefly to FIG. 3, the nonce encryption step is shown in more detail. More specifically, and as indicated by step 302 in FIG. 3, key 24 is retrieved from the aforementioned separate key server 22, which is physically separate from nonce server 12 and which is not "outward facing", or accessible by sender 16 or receiver 20. Once retrieved, the nonce 18 is encrypted at the nonce server 12 using key 24, as indicated by step 304. After encryption of the nonce, the key is returned to the remote key server node 22, as depicted by step 306 in FIG. 3.

Referring primarily back to FIG. 2, once the nonce is encrypted at the nonce server 12 as described above, the sender 16 can receive an e-mail, either automatically generated by the web server or perhaps informally from the receiver 20 that sender 16 can now transmit data/information securely over the network 10 via nonce server 12. The sender can log into the nonce server 12 and can input the data to be transmitted (be it text, image, or otherwise) by filling the pending information that the receiver opened at nonce sever 12 with data, or by sending the data directly to the nonce server. This step is illustrated by block 110 in FIG. 2. Once this occurs, nonce server 12 can decrypt the nonce that corresponds to this particular information between sender 16 and receiver 20, as shown in block 112. This can be accomplished retrieving key 24 from key server 22 and using the retrieved encryption key to decrypt the nonce, and returning key 24 to key sever 22. Nonce can then be used to encode the sender's information, as indicated by step 114 in FIG. 2.

After encoding of the sender's information with the decrypted nonce, the decrypted nonce can then deleted from nonce server 12 (as indicated by step 115 in FIG. 2), and the sender's information (which has been encoded by the nonce), can be stored on nonce server 12 for future access by receiver 20. With this configuration, the encrypted information and its encryption key (the nonce) exist simultaneously at the nonce servers only for a very brief amount of time (i.e., the time to delete it, which is perhaps milliseconds). If the nonce is sufficiently long (say, 128 bits) then for all intents and purposes, the only person capable of decrypting the information is the receiver, who has previously recorded that nonce and had a copy at the receiver's location.

The next time the receiver accesses nonce server 12, and as indicated by step 116 in FIG. 2, the receiver 20 will see that encoded information is available. Or, the receiver 20 can be notified by nonce server 12 that encoded information is waiting for receiver 20. Receiver 20 can input the nonce (at this point, the receiver's copy of the nonce is the only remaining copy of the nonce) to the nonce server 12; nonce server 12 can decode the data from sender 16, using the receiver's copy of the nonce and transmits the data to the receiver, as indicated by step 118 in FIG. 2. After receiver 20 has read or securely downloaded the information, the information can be deleted from nonce server 12. Once the data/information is deleted, the nonce server 12 has neither the nonce used to encrypt the data nor the data itself.

For the receiver to send secure information back to the sender, the process can be repeated, where the receiver becomes the sender and vice versa.

In several embodiments, the encrypted nonce could be deleted from nonce server 12 if sender 16 does not transmit data within a predetermined amount time after being notified that a nonce has been generated by architecture 10 for transmission of data; this can greatly reduce the chance of the information being compromised once transmitted. The same could be done for the encoded information, i.e., once encoded by the nonce, the nonce server 12 can delete the encrypted information if receiver 20 does not access nonce server 12 within a predetermined amount of time after encoding of the information using the decrypted nonce. For the methods according to several embodiments, the generation of a unique nonce corresponding to each transmission of data allows for the transmission of the data without the need to share a password between the sender 16 or receiver 20, and the architecture and methods according to several embodiments do not require that either the sender 16 or receiver 20 incorporate additional hardware, software, or asymmetric keys at their respective locations.

The secure transmission of the nonce to the receiver 20 (step 106) may be transparent to the receiver, so that when the receiver logs back in to receive secure information, a directory on the receiver's computer can automatically be searched for the nonce. The nonce can then be securely transmitted back to the web server for decoding of the sender's information at the nonce server. In some embodiments, the encoded information can be transmitted to the receiver 20 while it is still encoded, and the receiver can decode the information locally (at the receiver's location), using the last remaining copy of the nonce, which is possessed by the receiver.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A receiver-initiated method for secure transmission of information over a network from a sender to a receiver, said network having a nonce server, said method comprising the steps of:
   A1) receiving a request for said information from said receiver;
   A2) generating a nonce at said nonce server in response to the request for said information;
   B) transmitting said nonce from said nonce server to said receiver;
   C) encrypting said nonce at said nonce server, using a key from a key server that is physically separate from said nonce server and that is not accessible by said sender or said receiver;
   D) receiving said information from said sender at said nonce server;
   E) decrypting said nonce at said nonce server, using a key from a key server that is physically separate from said nonce server and that is not accessible by said sender or said receiver;
   F) encoding said information with said nonce at said nonce server using the results of said step E);
   F1) transmitting the results of said step F) to said receiver;
   G) decoding said information using the results of said step B);
   H) Deleting said nonce from said nonce server, said step H) being immediately accomplished after completion of said step F) and before accomplishment of said step G);
   I) deleting said nonce from said nonce server, said step I) being accomplished if said step D) is not initiated within a predetermined amount time after the accomplishment of said step C); and,
   said step C) through said step F) being accomplished while said receiver is disconnected from said network, said step A1) through said step C) being accomplished before said sender logs on to said network.

2. A server architecture for secure transmission of data from a sender to a receiver, said architecture including at least one server node, at least one key server that is physically separate from said server node and that is not accessible by said sender or said receiver, at least one processor, and a non-transitory computer readable medium containing computer instructions stored therein for causing said processor to accomplish a method comprising the steps of:
   A1) receiving a request for said data from said receiver;
   A2) generating a nonce at said server node in response to the request for said data;
   B) transmitting said nonce from said at least one server node to said receiver;
   C) encrypting said nonce at said server node with a key from said key server;
   D) receiving said data from said sender at said server node;
   E) decrypting said nonce at said server node with a key from said key server;
   F) encoding said data with said nonce at said server node using the results of said step E);
   F1) transmitting the results of said step F) to said receiver;

G) decoding said data at said receiver using the results of said step B);

H) Deleting said nonce from said at least one server node, said step H) being immediately accomplished after completion of said step F) and before accomplishment of said step G;

I) deleting said nonce from said at least one server node, said step I) being accomplished if said step D) is not accomplished within a predetermined amount time after the accomplishment of said step C); and, said step C) through said step F) being accomplished while said receiver is disconnected from said network, said step A1) through said step C) being accomplished before said sender logs on to said network.

\* \* \* \* \*